(12) United States Patent
Richter

(10) Patent No.: US 6,283,862 B1
(45) Date of Patent: *Sep. 4, 2001

(54) COMPUTER-CONTROLLED GAME SYSTEM

(75) Inventor: Wolfgang Richter, Bockhorn (DE)

(73) Assignees: Rosch Geschaftsfuhrungs GmbH & Co.; Virtual Laser Games KG, both of (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,140

(22) Filed: Apr. 3, 1998

(51) Int. Cl.⁷ ...................................................... F41J 5/00
(52) U.S. Cl. ................................. 463/51; 463/2; 463/52; 463/53; 463/54; 463/55; 463/56; 434/22
(58) Field of Search ............................. 463/2, 5, 51–56; 273/371–377, 454–455, 460; 434/16–24

(56) References Cited

U.S. PATENT DOCUMENTS

| | | | |
|---|---|---|---|
| Re. 32,662 | * | 5/1988 | Pennington ........................ 273/86 B |
| 3,788,748 | * | 1/1974 | Knight et al. .......................... 356/141 |
| 4,239,962 | * | 12/1980 | Oehler ................................ 250/222 R |
| 4,264,309 | | 4/1981 | Brooksby ................................ 434/20 |
| 4,290,757 | | 9/1981 | Marshall et al. ........................ 434/12 |
| 4,334,221 | * | 6/1982 | Rosenhagen et al. ......... 340/825.72 |
| 4,395,045 | | 7/1983 | Baer ..................................... 273/312 |
| 4,398,722 | * | 8/1983 | Morris et al. ......................... 273/310 |
| 4,710,873 | | 12/1987 | Breslow et al. ....................... 364/410 |
| 4,924,216 | * | 5/1990 | Leung ................................... 340/709 |
| 4,948,371 | * | 8/1990 | Hall ........................................ 434/21 |
| 5,098,110 | * | 3/1992 | Yang ..................................... 273/438 |
| 5,194,008 | * | 3/1993 | Mohan et al. .......................... 434/22 |
| 5,215,465 | | 6/1993 | Marshall et al. ........................ 434/22 |
| 5,248,150 | * | 9/1993 | Koma .................................... 273/313 |
| 5,281,142 | * | 1/1994 | Zaenglein, Jr. ......................... 434/19 |
| 5,366,229 | | 11/1994 | Suzuki .................................. 273/310 |
| 5,591,032 | * | 1/1997 | Powell et al. ........................... 434/22 |
| 5,676,548 | * | 10/1997 | McAlpin et al. ....................... 434/19 |
| 5,690,492 | * | 11/1997 | Herald ................................... 434/20 |
| 5,738,522 | * | 4/1998 | Sussholz et al. ....................... 434/22 |
| 5,823,779 | * | 10/1998 | Muehle et al. ......................... 434/19 |
| 5,904,621 | * | 5/1999 | Small et al. ........................... 434/52 |
| 5,988,645 | * | 11/1999 | Downing ............................. 273/348 |

FOREIGN PATENT DOCUMENTS

| | | | |
|---|---|---|---|
| 35 23 459 A1 | 1/1986 | (DE) | ................. F41G/3/26 |
| 42 45 074 C1 | 2/1994 | (DE) | ............. H04N/5/232 |
| 04051987 | 2/1992 | (EP) | ................. A63F/9/22 |
| 0 623 799 A1 | 11/1994 | (EP) | ................. F41G/3/26 |
| 0 661 658 A2 | 7/1995 | (EP) | ............. G06F/19/00 |
| 1 570 227 | 6/1980 | (GB) | ................. A63F/9/00 |
| 2 259 559 | 3/1993 | (GB) | ............. F41A/33/02 |
| 2-157441 | of 1990 | (JP) | ............. F02D/41/08 |

* cited by examiner

Primary Examiner—Valencia Martin-Wallace
Assistant Examiner—Carmen D. White
(74) Attorney, Agent, or Firm—Haverstock & Owens LLP

(57) ABSTRACT

A computer-controlled game system comprising a computer unit (10) which is adapted for the generation of a game sequence from at least one computer program and from game sequence data, a playback device (12) which is adapted to play back the game sequence in a projection zone and which is connected with the computer unit (10), at least one transmitter means (16) which is adapted for emitting an electromagnetic beam (S) into a predeterminable partial section of the projection zone, a detector means (18) which is adapted for the detection of the electromagnetic beam (S) when same hits the predeterminable partial section of the projection zone, said detector means (18) being connected with the computer unit (10) and adapted to transmit a signal to the computer unit (10), which is characteristic for the respective detected beam, and an alignment device (20) which is associated with the detector means (18) and which is connected with the computer unit (10) in order to align the detector unit (18) to a predeterminable partial section of the projection zone.

22 Claims, 2 Drawing Sheets

COMPUTER-CONTROLLED GAME SYSTEM

DESCRIPTION

The present invention relates to a computer-controlled game system with a computer unit which is adapted for the generation of a game sequence from at least one computer program and from game sequence data, a playback device which is adapted to play back the game sequence in a projection zone and which is connected with the computer unit. Game systems of this type are preferably displayed on a video screen. Due to the fact that the location of the electron beam during the image setup is known or determinable at any time, a certain zone on the video screen can be defined. If, for example, a photo sensor is arranged at one end of a tube the other end of which is open and directed to this zone, said photo sensor emits a signal at a time in which the electron beam is within this defined zone. This can be evaluated for the game sequence.

Arrangements of this type are, however, of limited usability insofar as on the one hand the display area is defined by the size of the video screen. It is, of course, possible to arrange several video screens adjacent to each other and above each other and to divide the image to be displayed by suitable circuitry in such a manner that each video screen displays a part of the entire image which corresponds to its position. This, however, is very expensive and requires considerable expenditure in terms of equipment. On the other hand, the possibility to have several players participate simultaneously or competitively in the game is very hard to realize. After all, the photo sensor in current game systems has to be directly connected with the computer unit for accurately detecting the exact time at which the electron beam is at a predetermined location on the video screen.

In view of the above explained and other problems of the arrangements of the state of the art the invention is based on the object to provide a computer-controlled game system which offers the possibility to overcome these problems.

For this purpose the computer-controlled game system according to the invention comprises at least one transmitter means which is adapted for emitting an electromagnetic beam into a predeterminable partial section of the projection zone, a detector means which is adapted for the detection of the electromagnetic beam when same hits the predeterminable partial section of the projection zone, said detector means being connected with the computer unit and adapted to transmit a signal to the computer unit, which is characteristic for the respective detected beam, and an alignment device which is associated with the detector means and which is connected with the computer unit in order to align the detector unit with a predeterminable partial section of the projection zone.

This inventive scheme allows a plurality of players to participate simultaneously in one game. In addition, the individual players with their transmitter means can participate in several games which run in parallel on various projection zones. Moreover, the free movability of the player is no longer restricted because the transmitter means need no longer be connected with the controller via a line. The invention also allows a considerably simpler, also dynamic determination of the predeterminable partial section of the projection zone. Finally, the invention provides for the properties (colour, brightness, dimensions, duration of presence) of the predeterminable partial section to be completely independent of the image which is present at the same location of the projection zone because the intensity, duration and size of the predeterminable partial section can be established by adjusting the detector means and its alignment device.

The computer unit is preferably connected with a memory means for the control program and the game sequence data in the form of still or moving image sequences and symbols and/or an interface unit for the detector means and/or a control unit for the alignment device. The still or moving image sequences and symbols can be provided either as digital data or in the form of film or video recordings.

The playback device can be adapted for the playback of a two-dimensional image on a projection surface, for the playback of a three-dimensional image in a projection space and/or of tone, sound and/or noise. For two-dimensional images a film projector, a video projection device (so-called video canon) or the like is suitable. For three-dimensional images laser projection equipment or hologram projectors as well as other systems which enable a three-dimensional image playback (active or passive 3D spectacles or the like) are suitable.

In a preferred embodiment of the invention the transmitter means is adapted for the emission of a directed electromagnetic beam, preferably a visible light beam, with the electromagnetic beam being provided with an identification which is characteristic for the transmitter means. The light beam can be generated by an ultra-bright LED array (with a lens system arranged before same) or by a semiconductor laser arrangement, with the identification being modulated upon same (by means of frequency, amplitude, phase modulation or the like). It is, however, also possible to use a conventional incandescent lamp as the visible primary source for the beam and emit additionally, for example, a focussed modulated infrared beam.

If the transmitter means comprises a presettable timer for setting a ready-to-transmit period within which the transmitter means is capable of emitting the electromagnetic beam, then the simple possibility is given to limit the game duration for the respective player so that a (repeated) release, e.g. upon paying a certain amount of money, is effected. As an alternative to the timer a presettable counter may be provided by means of which a maximum number of output pulses of the electromagnetic beams can be set.

In order to limit the current consumption of the transmitter means and to prevent a continuous beam the transmitter means preferably comprises a trigger circuit for emitting a pulse of the electromagnetic beam upon the actuation of same. In addition, a predetermined forced pause can be provided via a release timer after each triggering action.

In a preferred embodiment of the invention the transmitter means comprises a directional indicator with a series of optical signal generators, which faces in the direction of an emitted electromagnetic beam. This directional indicator can be realized either actively in the form of an arrow shaped continuous light series, if desired, or a travelling light series or passively (e.g. light spots or light strips which can be activated by UV light).

In a preferred embodiment the transmitter means is connectable with the computer unit for the transfer of information, in particular of an identification, a maximum ready-to-transmit period, a transmission pulse duration, a transmission pulse repeat rate, or a maximum pulse number. This permits a particularly simple configuration of the transmitter means. Thus, in particular, it is possible to determine via the computer unit which transmitter means (over which period of time) participate in the game. The data communication connection can be both a serial and a parallel interface. In addition, the operating voltage for the transmitter means can be fed into an accumulator. Preferably, the transmitter means also includes a power management circuit so that after expiry of the timer time the transmitter means goes into a standby mode from which it only goes (returns) into a ready-to-operate mode after reloading with information and, if necessary, current supply to the accumulator.

The alignment device is preferably adapted to align the detector means or electromagnetic radiation which impinges on the detector means in at least two coordinates under the control of the computer unit. This allows the predeterminable partial section of the projection zone where the electromagnetic radiation is "expected" by the detector means to be predetermined and modified in a very simple manner.

This is particularly easy by means of horizontally and vertically adjustable mirrors which can be swivelled in a 90° offset relationship relative to each other. Each mirror is secured to a permanent magnet which is rotatably supported and arranged in an electromagnetic coil. If the coil is subjected to a control current by the computer unit—if required via an intermediate control unit—the permanent magnet rotates together with the mirror secured to it. The detector means can thus be aligned very quickly to the predeterminable partial section of the projection zone so that electromagnetic beams which are emitted by a transmitter means and which arrive in this partial section can be detected by the detector means.

Alternatively, this can also be achieved by a horizontally and vertically motor-operated swivellable detector means which is supported in a manner similar to a cardanic suspension.

Swivelling the alignment device or the detector means, respectively, also enables a dynamic change of the location at which the predeterminable partial section of the projection zone is positioned. In this way both simple tasks (hitting a certain—also moving—area with the light beam) and more complicated tasks (continuous tracking of a predeterminable partial section of the projection zone or copying of contours) can be realized, with the respective actual location onto which the beam of the transmitter means is to be directed being indicated to the player or the players.

Depending on the playback device which is used for the image sequence of the game sequence on the one hand and the light source used in the transmitter means on the other hand the brightness ratio amounts to up to 1:100 (image:beam). This permits a reliable detection of a beam directed onto the image.

In order to avoid, in particular, that a player directs the transmitter means directly onto the detector means and emits a beam (which might lead to falsified hit indication) the detector means is preferably assigned a shielding means against external light influences. In a preferred embodiment this is realized by a tube which is arranged between the detector means and the alignment device. It can, however, also be realized by means of corresponding focussing and directional lenses as well as filters.

In order to enhance safeguarding the detector means against direct radiation the detector means can be assigned a second detector which is adapted to detect environmental radiation and a direct impingement of an electromagnetic beam and to emit a signal which indicates this condition for the computer unit. The computer unit can evaluate this signal in such a manner that the corresponding transmitter means can be identified from the identification transmitted together with the beam and, if required, beams which are emitted from this transmitter means over a certain period of time are not scored.

The computer unit of the computer-controlled game system modifies the game sequence as a function of the transmitted signal. This is done for example in such a manner that the corresponding player is determined from the identification of the transmitter means, and for him a hit, a correct answer, or the like is registered.

In a preferred embodiment of the invention the computer unit can be connected with a video camera in order to record images which are integrated into a game sequence under program control. This enables, for example, the recording of portrait images of all players participating in a game and the fading in or integration by other means of the winner's image into the game sequence.

Instead of integrating the images recorded by the video camera into a game sequence as a function of signals from the detector means the computer program can also incorporate images or parts of same into the game sequence. This offers the possibility, for example, to use the portrait images of players for characters acting in the game sequence.

The computer unit preferably comprises a memory for detected signals from a transmitter means with a predeterminable image and/or tone sequence being optically and/or acoustically representable via the playback device as a function of the contents of the memory and the identification of the respective transmitter means. It is thus possible to integrate signals, images of the player or other symbols into the game sequence upon a certain memory content ("hit", certain number of hits or the like).

A sequence of descriptors for predeterminable partial sections of the projection zone is preferably stored in the memory means which can be correlated with the game sequence by the computer program. It is thus possible to establish a sequence of locations via any game sequence where—parallel to the game sequence—predeterminable partial sections of the projection zone are positioned. The generation of the descriptor sequence can, for example, take place in such a manner that the game sequence is displayed step by step on the projection zone and corner or marginal areas of the predeterminable partial sections of the projection zone are marked for individual scenes by a transmitter means by emitting a beam, while the detector means—under the control of the computer unit—scans the projection zone until the beam is detected.

As an alternative the moving predeterminable partial section of the projection zone (e.g. a certain symbol) can be marked in the file from which the data for the game sequence is retrieved. With each occurrence of the partial section in the game sequence its coordinates and/or size is known or determinable so that in each time the location of occurrence of this partial section in the projection zone is also known or determinable. This, however, requires a calibration of the game sequence which is projected onto the projection zone. This calibration can be effected in such a manner that a test image is projected onto the projection zone with the computer program knowing the coordinates of certain conspicuous points in this test image. A light beam is directed to these points by means of a transmitter means while the computer unit—under the control of the computer program—swivels the detector means by means of the alignment device in a controlled manner until the light beam directed to this point is detected. From the orientation of the detector means a relation with respect to the respective point can be derived so that the coordinates in the projection zone of any other object during the game sequence can be calculated therefrom.

In other words, the alignment device is driven by the computer unit as a function of the descriptors in such a manner that the detector means is aligned to a predeterminable partial section of the projection zone and that it will also be tracked in the case of moving image sequences (with a moving object which represents or includes the predeterminable partial section).

The invention also relates to a transmitter means, in particular for an above described computer-controlled game system, comprising a signal generator for generating an electrical signal which is supplied to a converter which emits an electromagnetic beam in accordance with the signal, an identification generator which supplies the signal generator with an identification which is characteristic for the transmitter means, and preferably a presettable pulse counter which is connected with the signal generator in order to limit the ready-to-transmit mode of the transmitter means. The above described function units can be realized both by means of integrated elements as well as by a hardware/software solution in a microprocessor.

Such a transmitter means is preferably equipped with a connecting means for connecting the identification generator, the timer and/or the pulse counter with a computer unit in order to read in corresponding information from the computer unit.

In a particularly preferred embodiment the transmitter means is arranged in a holder which enables the transmitter means to be fastened to the back of a player's hand. For this purpose the holder is provided with an elastic base plate which fits the back of the hand and which is provided with loops for one or several fingers as well as for the wrist. In addition, webs can be arranged at the base plate which with the transmitter means attached to the player's hand project between two fingers and thus stabilize the transmitter means on the back of the player's hand. In lieu of attaching the transmitter means to the back of the player's hand a rifle or gun-shaped configuration of the transmitter means can be provided as well. It is also possible to attach the transmitter means to spectacles or a helmet or the like.

The characteristics of the claims can also be combined in a manner which deviates from the referring back of the claims. Such combinations of inventive characteristics are also claimed.

BRIEF DESCRIPTION OF THE DRAWINGS

Further characteristics, properties, and advantages of the present invention will be explained with reference to the following description of the figures.

Figure 1:
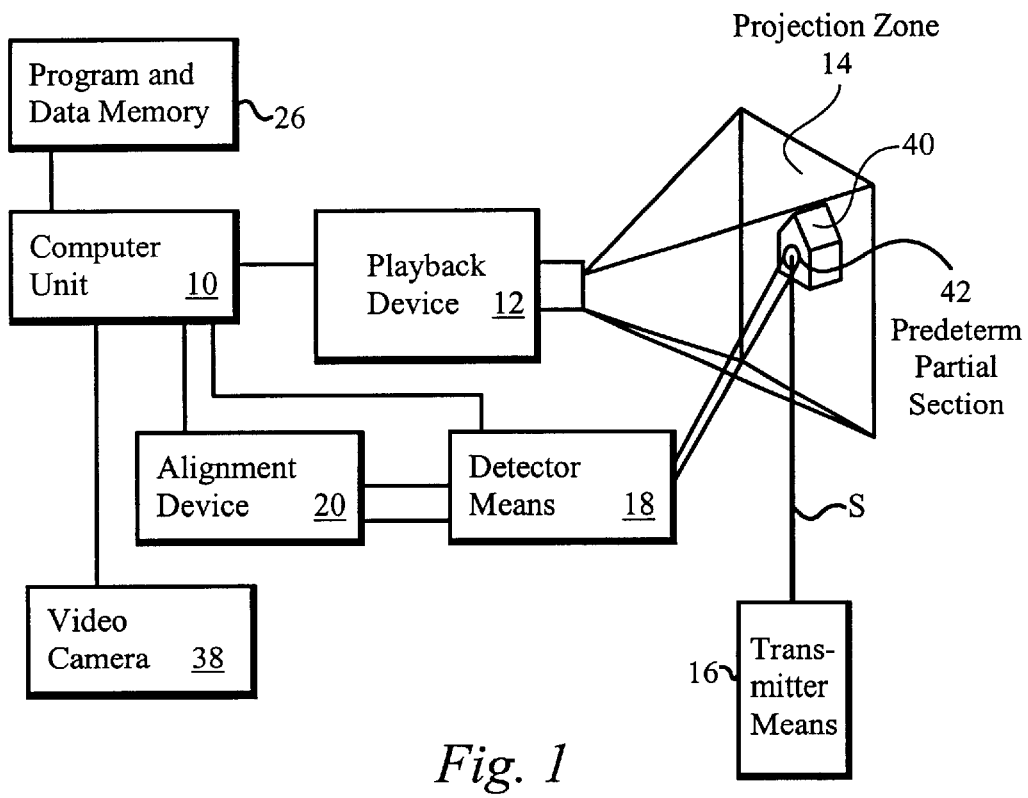
FIG. 1 shows an inventive schematic block diagram of the computer-controlled game system according to the invention.
Figure 2:
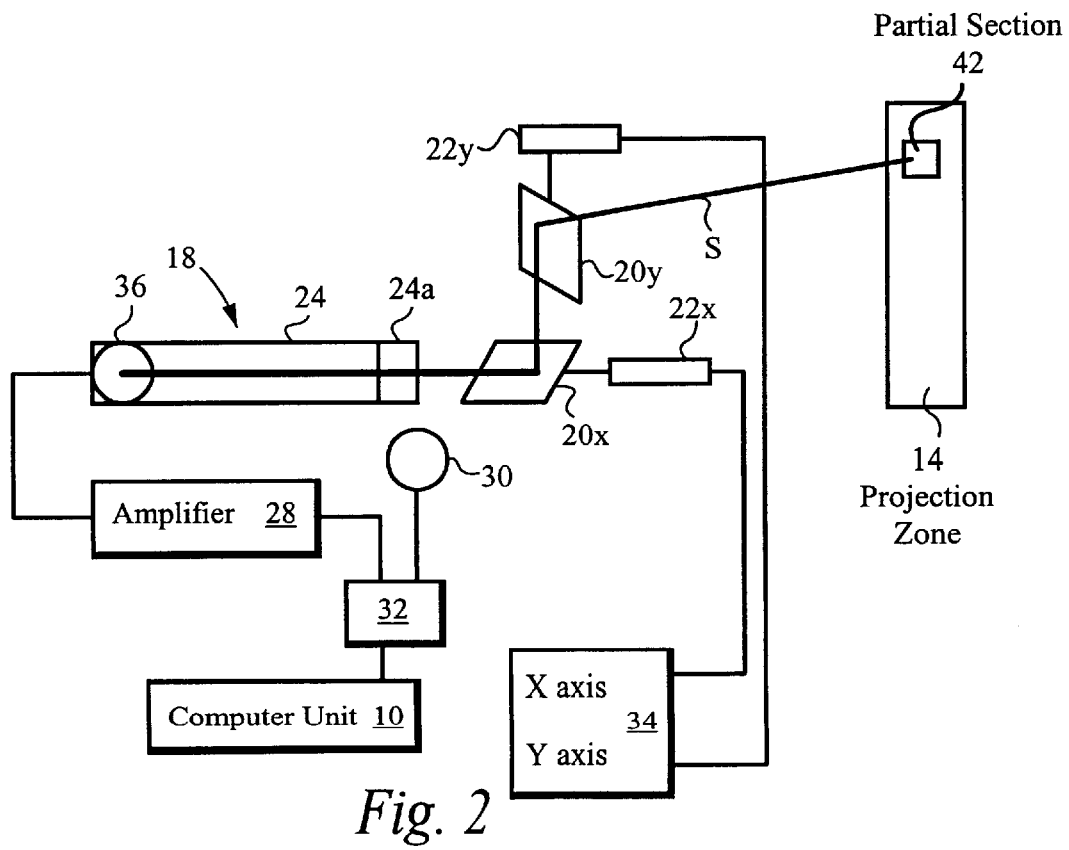
FIG. 2 shows an embodiment according to the invention of a detector means with an alignment device in a schematic block diagram.
Figure 3:
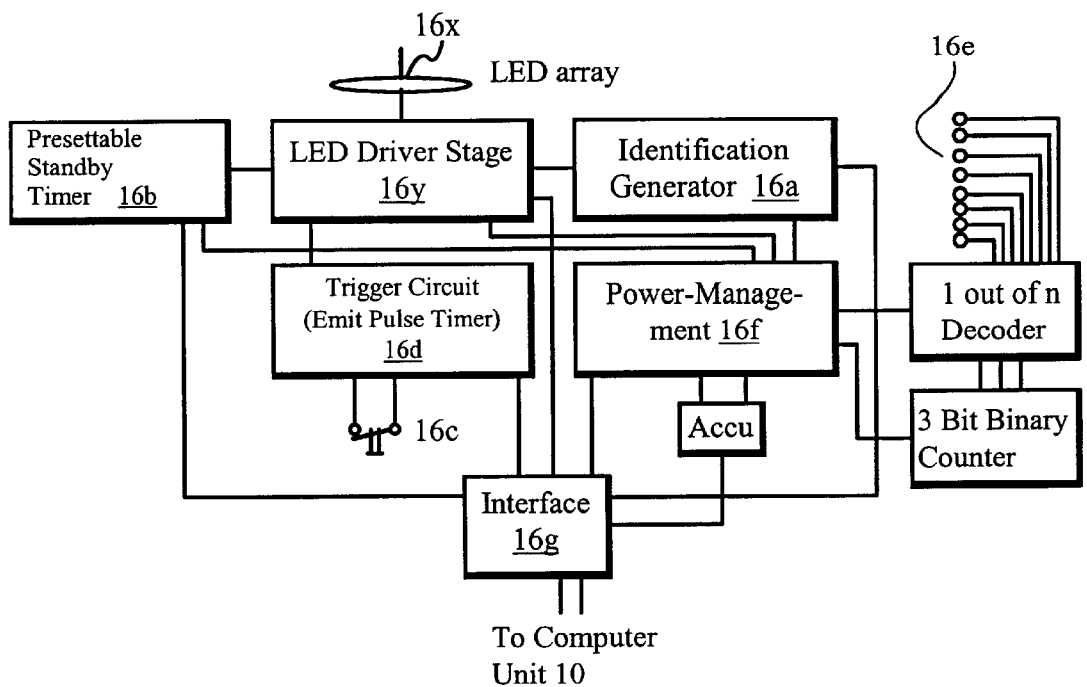
FIG. 3 shows an embodiment according to the invention of a transmitter means with an alignment device in a schematic block diagram.

The inventive computer-controlled game system comprises a computer unit 10 in the form of a PC (personal computer), which is adapted for the generation of a game sequence from at least one computer program and from game sequence data.

The computer unit 10 is connected with a playback device 12 in the form of a video canon which is adapted to play back the game sequence in a projection zone 14.

The player or each player has a transmitter means 16 which is adapted to emit an electromagnetic beam S into a predeterminable partial section 42 of the projection zone 14.

The computer unit 10 is connected with a detector means 18 which is adapted for the detection of the electromagnetic beam S.

The computer unit 10 is additionally connected with an alignment device 20 which is associated with the detector means 18. The alignment device 20 serves to align the detector means 18 to the predeterminable partial section 42 of the projection zone 14.

If the electromagnetic beam S hits the predeterminable partial section 42 of the projection zone 14 the detector means 18 transmits a signal which is characteristic for respective detected beam to the computer unit 10.

The game sequence—in its simplest form—can be a moving image sequence in which a certain object 40 appears occasionally which has to be marked by the players by means of the electromagnetic beam S. Then the computer unit 10 coordinates the orientation of the detector means 18 by means of the alignment device 20 in such a manner that the detector means 18 is always aligned to the object 40. Here, the object 40 represents the predetermined partial section 42 of the projection zone 14 or encompasses same.

The computer unit 10 is connected with a memory means 26 for the control program and the game sequence data in the form of still or moving image sequences and symbols, and an interface unit 28 for the detector means 18, and a control unit 34 for the alignment device 20.

The transmitter means 16 emits the electromagnetic beam S in the form of a directed visible light beam from an ultra-bright LED array 16x which is driven by a driver stage 16y, with the electromagnetic beam S being frequency or amplitude modulated with an identification which is characteristic for the respective transmitter means 16 in the form of a number (e.g. 0123) which is provided by an identification generator 16a.

In addition, the transmitter means 16 comprises a presettable timer 16b for setting a ready-to-transmit period T1 within which the driver stage 16y is released so that the transmitter means 16 can emit the electromagnetic beam S.

Moreover, the transmitter means 16 comprises a trigger circuit 16c with a monostable circuit 16d connected downstream thereof which upon the actuation of the trigger circuit 16c emits a signal with a predetermined time period T2 to the driver stage 16y in order to cause same to emit a pulse of the electromagnetic beam S with the time period T2.

At the outside of a housing of the transmitter means 16 a directional indicator with a series of optical signal generators in the form of LEDs 16e which are driven via a travelling light circuit (1 out of n decoder which is driven by a counter) and face in the direction of an emitted electromagnetic beam S.

Moreover, a power management circuit 16f is provided which controls the current supply to the individual components in the transmitter means 16.

Finally, the transmitter means 16 comprises an interface 16g in order to be able to be connected with the computer unit 10 for the transmission of information. Said information includes, in particular, an identification, a maximum ready-to-transmit time T1, a transmission pulse duration T2, if necessary a transmission pulse repeat rate, or a maximum pulse number. The interface 16g can have a serial or parallel configuration and transmit the information either via a line or in a wireless manner (e.g. by means of an infrared interface).

The alignment device 20 is formed by two mirrors 20x, 20y each of which can be swivelled via an actuator (stepping motor, servo motor, magnetic coil, piezo crystal or the like) 22x, 22y about an X axis or a Y axis, respectively. A light beam which impinges on the mirror 20y is transferred to the mirror 20x and from same to a tube 24 at whose far end relative to the inlet side 24a a photo sensor 36 is arranged. Light which impinges on the photo sensor 36 releases a signal which is supplied to the computer unit 10 via an amplifier 28.

The two actuators 22x, 22y are driven by a driver circuit 34 which receives coordinate signals from the computer unit 10.

The photo sensor 36 is assigned a second detector 30 which serves to detect environmental radiation and a direct impingement of an electromagnetic beam. A signal which is emitted by the detector 30 is compared in a comparator 32 with the signal from the photo sensor 36, and the comparison result is transferred after an additional pulse shaping, if required, to the computer unit 10.

The computer unit 10 is connected with a video camera 38 for recording images which are integrated under program control into a game sequence.

In addition to the program controlling the game sequence and the image sequences of the game sequence a series of descriptors of predeterminable partial sections of the projection zone is stored in the memory means 26, which can be correlated with the game sequence by the computer program.

The alignment device 20 can be driven via the actuators 22x, 22y by the computer unit 10 as a function of the descriptors in such a manner that the detector means is aligned to a predeterminable partial section of the projection zone.

For this purpose a script file D is maintained in the memory means 26 in which the descriptors of the following data structure are included:

1. Serial number (S/N)
2. X coordinate of the predetermined partial section of the projection zone (X coord.)
3. Y coordinate of the predetermined partial section of the projection zone (Y coord.)
4. Extension of the predetermined partial section of the projection zone in the X direction (dx)
5. Extension of the predetermined partial section of the projection zone in the Y direction (dy)
6. Starting point and time duration, during which values 2to 5 apply
7. Supplementary data.

Figure 4:
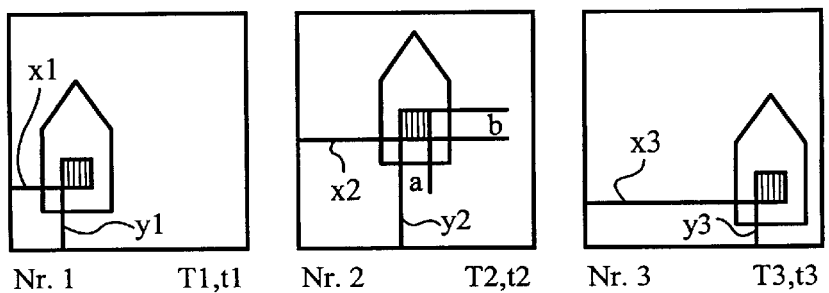
FIG. 4 shows an inventive data structure of a script file.

This data format is based on an essentially rectangular shape of the predetermined partial section of the projection zone (see FIG. 4). In the case of a circular shape of this partial section (which is primarily dependent on the shape of the photo sensor and the upstream optical components) a data format which is adapted to a circle can also be used. In lieu of the time starting point and the duration during which the values 1 to 4 apply reference marks can also be stored in the data of the moving image sequence, which are contained one-to-one in the script file D. In the course of the game, the computer program will then synchronize the data from the script file D with the corresponding images from the moving image sequence so that the detector means is always aligned to the corresponding partial section.

What is claimed is:

1. A computer-controlled game system comprising
   a computer unit for generating a game sequence from at least one computer program and from game sequence data;
   a playback device which plays back the game sequence in a projection zone and which is coupled to the computer unit;
   at least one transmitter for emitting an electromagnetic beam into the projection zone;
   a detector coupled to the computer unit and configured for detecting the electromagietic beam and transmitting a signal to the computer unit; and
   an alignment device coupled to the computer unit such that the computer controls alignment of the detector such that the detector detects the electromagnetic beams when the electromagnetic beam hits a predeterminable partial section of the projection zone and the detector does not detect the electromagnetic beam when the electromagietic beam hits the projection zone in other than the predeterminable partial section of the projection zone.

2. The computer-controlled game system according to claim 1, wherein the computer unit is coupled to at least one of
   a memory for a control program and for the game sequence data in the form of still or moving image sequences and symbols,
   an interface unit for the detector, and
   a control unit for the alignment device.

3. The computer-controlled game system according to claim 1, wherein the playback device plays back at least one of a two-dimensional image, a three-dimensional image, tone, sound, and noise.

4. The computer-controlled game system according to claim 1, wherein the electromagnetic beam emitted from the transmitter is a directed electromagnetic beam which is provided with an identification which is characteristic for the transmitter.

5. The computer-controlled game system according to claim 4, wherein the identification of the electromagnetic beam is imprinted on the electromagnetic beam as modulation of the electromagnetic beam.

6. The computer-controlled game system according to claim 1, wherein the transmitter comprises a presettable timer in order to set a ready-to-transmit duration within which the transmitter can emit the electromagnetic beam.

7. The computer-controlled game system according to claim 1, wherein the transmitter comprises a trigger circuit in order to emit a pulse of the electromagnetic beam with a predetermined time duration upon actuation of the trigger circuit.

8. The computer-controlled game system according to claim 4, wherein the transmitter comprises a directional indicator with a series of optical signal generators and faces in the direction of the electromagnetic beam.

9. The computer-controlled game system according to claim 1, wherein the transmitter is connected with the computer unit for the transmission of information including at least one of an identification, a maximum ready-to-transmit duration, a transmission pulse duration, a transmission pulse repeat rate and a maximum pulse number by means of an interface.

10. The computer-controlled game system according to claim 1, wherein the alignment device aligns the detector under the control of the computer unit in at least two coordinates.

11. The computer-controlled game system according to claim 1, wherein the detector is assigned a shielding means against external light influences.

12. The computer-controlled game system according to claim 1, wherein the detector is assigned a second detector for detecting environmental radiation and a direct impingement of the electromagnetic beam and emitting an indicator which represents at least one of the environmental radiation and the direct impingement for the computer unit.

13. The computer-controlled game system according to claim 1, wherein the computer unit varies the game sequence as a function of the signal from the detector.

14. The computer-controlled game system according to claim 1, wherein the computer unit is coupled to a video camera in order to detect images which are integrated into the game sequence under control of the computer program.

15. The computer-controlled game system according to claim 13, wherein images which are detected by a video camera are integrated into the game sequence.

16. The computer-controlled game system according to claim 1, wherein the computer unit comprises a memory for storing the signal detected from the transmitter, with at least one of a predeterminable image and tone sequence being at least one of optically and acoustically representable under the control of the computer program via the playback device as a function of contents of a memory and an identification of the transmitter.

17. The computer-controlled game system according to claim 2, wherein a series of descriptors of the predeterminable partial section of the projection zone is stored in the memory and correlated with the game sequence by the computer program.

18. The computer-controlled game system according to claim 17, wherein the alignment device is driven by the computer unit as a function of the descriptors in such a manner that the detector is aligned to the predeterminable partial section of the projection zone.

19. The computer-controlled game system according to claim 4, wherein the transmitter emits a visible light beam.

20. The computer-controlled same system according to claim 15, wherein the images which are detected by the video camera are integrated into the game sequence as a function of the signals from the detector.

21. The computer-controlled game system according to claim 1 further comprising means for calibrating the alignment device such that the computer unit downloads operational parameters to the detector until the detector receives the electromagnetic beam in a predetermined location.

22. The computer-controlled game system according to claim 1, wherein the alignment device downloads operational parameters to the detector until the detector detects the electromagnetic beam.

* * * * *